US008744540B2

(12) United States Patent
Tomasini et al.

(10) Patent No.: US 8,744,540 B2
(45) Date of Patent: *Jun. 3, 2014

(54) CRADLE FOR MOBILE PHONES

(75) Inventors: Ralf Tomasini, Haldenwang (DE); Jan Kettula, Espoo (FI); Yossef Schvetz, Milan (IT)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,565

(22) Filed: May 21, 2012

(65) Prior Publication Data

US 2012/0295667 A1 Nov. 22, 2012

Related U.S. Application Data

(63) Continuation of application No. 11/814,537, filed as application No. PCT/IB2005/000159 on Jan. 24, 2005, now Pat. No. 8,224,408.

(51) Int. Cl.
*H04M 1/00* (2006.01)
*H04M 1/04* (2006.01)
*B60R 11/00* (2006.01)

(52) U.S. Cl.
CPC .......... *H04M 1/04* (2013.01); *B60R 2011/0075* (2013.01)
USPC .................. 455/575.9; 455/569.2; 455/575.1; 455/575.8

(58) Field of Classification Search
USPC ........................ 455/569.2, 575.1, 575.8, 575.9
See application file for complete search history.

(56) References Cited

U.S. PATENT DOCUMENTS

| 5,230,016 A | 7/1993 | Yasuda |
| 6,084,963 A | 7/2000 | Hirai et al. |
| 6,215,870 B1 | 4/2001 | Hirai et al. |
| 6,266,544 B1 | 7/2001 | Tomura et al. |
| 7,719,613 B2 | 5/2010 | Kayanuma |
| 2003/0013500 A1 | 1/2003 | Dunoff et al. |
| 2005/0255895 A1 | 11/2005 | Lee et al. |
| 2006/0058070 A1 | 3/2006 | Chang |
| 2006/0105819 A1 | 5/2006 | Liao |
| 2007/0197264 A1 | 8/2007 | Itsukaichi |

FOREIGN PATENT DOCUMENTS

| CN | 1187078 A | 7/1998 |
| CN | 2448009 Y | 9/2001 |
| EP | 0829969 | 3/1998 |
| GB | 2374485 A | 10/2002 |

OTHER PUBLICATIONS

Chinese Patent Application No. 201110316756.3, Office Action and Text of First Office Action Translation, dated Aug. 13, 2013.
Chinese Patent Application No. 97114133 Translated Abstract, Publication No. 1187078, published Jul. 8, 1998.

*Primary Examiner* — Nathan Mitchell

(57) ABSTRACT

A cradle for a mobile phone includes a rear bearing surface; left and right side walls; two guide rails being located on the front side of the left and right side walls and protruding laterally from the side walls; a bottom part comprising a connector element for mechanically and electrically engaging a bottom connector of the mobile phone, the rear bearing surface, said side walls and the guide rails define left and right slots extending parallel to the side walls for receiving left and right side sections of a mobile phone; guiding a phone being inserted into the cradle to the bottom part; and retaining a mobile phone received against forces acting in a direction substantially perpendicular to the slots; how to lock the connector element onto a bottom connector of a mobile phone received in the cradle for retaining the mobile phone inside the cradle is shown.

28 Claims, 4 Drawing Sheets

CRADLE FOR MOBILE PHONES

CROSS REFERENCE TO RELATED APPLICATIONS

This application is a continuation of U.S. application Ser. No. 11/814,537, filed Jul. 23, 2007, which is the U.S. National Stage of International Application Number PCT/IB2005/000159, filed Jan. 24, 2005.

The present invention relates to a cradle for mobile phones, and particularly to a cradle for being installed in a vehicle.

Holder devices or so-called cradles for mobile phones are often used in vehicles, both for mechanically supporting the device and for electrically connecting it with hands-free devices and/or external antennas that are installed in the vehicle. There are also other accessory devices a phone can be connected with through such a cradle, for example an external speaker set. Such cradles have to meet various requirements, substantially relating to the handling by the user, the mechanical reliability of the cradle, the supporting properties for the mobile device and the reliability of electrical contacts.

The mechanical reliability mainly concerns the robustness of the cradle. The cradle should be designed to withstand various handling actions by a user. Further the cradle should be designed to suitably withstand the stresses it is subjected to because of the operation of the vehicle it is installed in. This particularly concerns vibrations and shocks as well as acceleration forces, which for example may occur during impacts because of accidents.

By suitably designing the supporting properties of the cradle the mechanical connection between cradle and mobile device must in principle be ensured. On the other hand the supporting or retaining forces also affect the usability, because they have to be overcome when releasing the mobile device from the cradle.

The connection between components being installed in the vehicle and the mobile device must be provided in a reliable manner. The aforementioned stresses because of the operation of the vehicle have to be taken into consideration here. Also the electrical contacts should be designed such that they an electrical connection can be established even after a high number of actuations, i.e. insertion and releasing actions.

There are a number of different phones and mobile devices concerning the housing concept, e.g. the conventional "brick type" or monoblock phones and also the newer fold and slide type phones. These phone types require different cradle configurations because of their special and different properties.

Conventional cradles make use of fixing pins on the cradle which engage corresponding fixing holes in the mobile phone. Thus insertion and release is not an easy task, particularly when the user only has one hand available for this action, as the fixing pins must exactly be aligned with the fixing holes in order for the phone to fit in the cradle. Further this conventional solution requires very strict design rules for both phone housing and cradle, i.e. it is not flexible with respect to form and location of fixing holes and pins. Providing the receptions in the housing is cost intensive and strongly limits the possibilities for designing corresponding mobile phones.

Therefore it is an object of the present invention to propose a new cradle structure providing a cradle that is easy to use, fulfilling the above discussed requirements, and though offering more flexibility with respect to design of both cradle and corresponding mobile devices.

According to an aspect of the present invention a cradle for a mobile phone is provided. The cradle comprises a rear bearing surface, left and right side walls, two guide rails being located on the front side of said left and right side walls and protruding laterally from said side walls, and a bottom part comprising a connector element for mechanically and electrically engaging a bottom connector of said mobile phone. The rear bearing surface, said side walls and said guide rails define left and right slots extending parallel to said side walls and are intended for receiving the left and right side sections of a mobile phone, for guiding a phone being inserted on the top side of said cradle to said bottom part, and for retaining a mobile phone received in said cradle against forces acting in a direction substantially perpendicular to said slots. The connector element comprises means for locking onto a bottom connector of a mobile phone received in said cradle for retaining said mobile phone inside said cradle against forces acting in a direction substantially parallel to said slots. A cradle according to the invention can be used for the main three principle types (also called form factors) of mobile phones currently used, which are the conventional monoblock type, the flip or fold type and also the slide type.

The cradle of the invention enables to omit special fixing pins for engaging fixing holes provided on a mobile phone, thus it is particularly useful for phones which do commonly not have such holes, e.g. fold phones. The invention enables a great deal of flexibility for design and support of a mobile phone holder device/cradle at the same time. The latter means that all requirements of retaining capabilities can be fulfilled with the cradle which may be required for crash safety and the like. It further offers the possibility to reduce costs in the mobile phone development process by reducing the costs for the required tooling (inter alia because of the fixing holes which can be omitted at all), and also by greatly simplifying the development work for electrical components. Through a modular design the invention also enables to use standard components (e.g. connector element) together with individual phone-specific components to provide a cradle perfectly adapted for a particular mobile phone that can though be manufactured with reduced effort and/or costs.

According to an exemplary embodiment said guide rails are tapering from said bottom part towards their upper ends. As the invention is particularly useful when used for receiving a mobile phone of the fold type this feature enables to keep the fold phone almost fully closed even while received in the cradle. To achieve this it is necessary to keep the guide rails particularly slim to allow the two halves of the phones housing to close as much as possible. As can be seen in FIG. 4 this is, because of the geometry of such phones, best achieved by providing guide rails which are formed tapering.

According to an exemplary embodiment the guide rails comprise a step defining upper and lower sections in said slots for receiving corresponding upper and lower sections of a mobile phone of the slide type in its open configuration. As mobile phones of this specific form factor have become rather popular it is advantageous to provide a universal cradle concept with the present invention which in this embodiment is suited for these phones. The step structure allows to receive the lower section of a (slid open) slide phone in the lower section of the slots and the upper section of the phone in the upper section of the slots.

According to an exemplary embodiment the connector element is fitted in said bottom part in an exchangeable manner. This allows a modular structure of the cradle according to the invention, wherein for example a standardized connector element is used together with a phone-specific cradle main body.

According to an exemplary embodiment the cradle further comprises at least one release element, wherein said release element, upon being actuated, disengages the locking between said connector element and said bottom connector of said mobile phone. Depending an the type of connector element, i.e. if it for example comprises locking hooks or clamps, such a release element is required for unlocking the engagement with the bottom connector. However, also in case the locking action does rely on friction between mechanically biased parts for example such a release element eases up the removal action of the mobile phone from the cradle.

According to an exemplary embodiment the release element, upon being actuated, further pushes a mobile phone received in said cradle upwards to assist in removing said phone from sad cradle. Particularly if the cradle is designed such that a mobile phone completely fits in, i.e. the phone does not protrude from the top side of the cradle, this feature assists the user in the removal action.

According to an exemplary embodiment the at least one release element is spring-loaded for assisting in disengaging said mobile phone from said connector element and pushing said mobile phone upwards. Using a spring-loaded element, for example metallic springs or elastomer elements, can help to reduce the force necessary to actuate a release button or like actuating means by the user.

According to an exemplary embodiment the release element is formed integrally with said connector element. This enables an advantageous modular design of the cradle.

According to an exemplary embodiment the cradle further comprises an interface for electrically connecting said connector element with accessory devices. As the cradle is intended mainly for being installed in a vehicle it has to comprise an interface to connect with a hands-free kit, an external antenna, a battery charger or other accessory devices. This interface can be implemented for example by a fixed cable with a plug for such devices, or a socket for a connection plug.

According to an exemplary embodiment the rear bearing surface, said side walls and said guide rails are formed integrally. Together with an also integral connector element/release element unit for example this provides for an advantageous structure offering a great flexibility with respect to design.

According to an exemplary embodiment the connector element comprises a USB connector. The Universal Serial Bus is a widely accepted bus system for connecting electronic devices of many kinds, like PCs, digital cameras, multimedia devices etc. Thus this embodiment can provide the connection capability that will be required for mobile phones comprising such a connector.

According to an exemplary embodiment the guide rails are spring-biased for applying a force to a mobile phone received in said cradle in a direction perpendicular to said slots. If for example the guide rails are at least partly resilient they can assist in retaining the mobile phone inside the cradle. As the abutment area is rather big this does not require large forces which would have to be overcome by a user upon the insertion of a mobile phone.

According to an exemplary embodiment the cradle further comprises mounting means for installing said cradle in a vehicle. Different mounting means can be provided with the cradle of the invention in order to adapt it for being installed in various car models.

In the following the present invention shall be explained in detail, with reference to the attached drawings, which show exemplary embodiments provided purely by way of example and are not to be understood as limiting the present invention to any specific embodiments illustrated. In the drawings.

Figure 1:
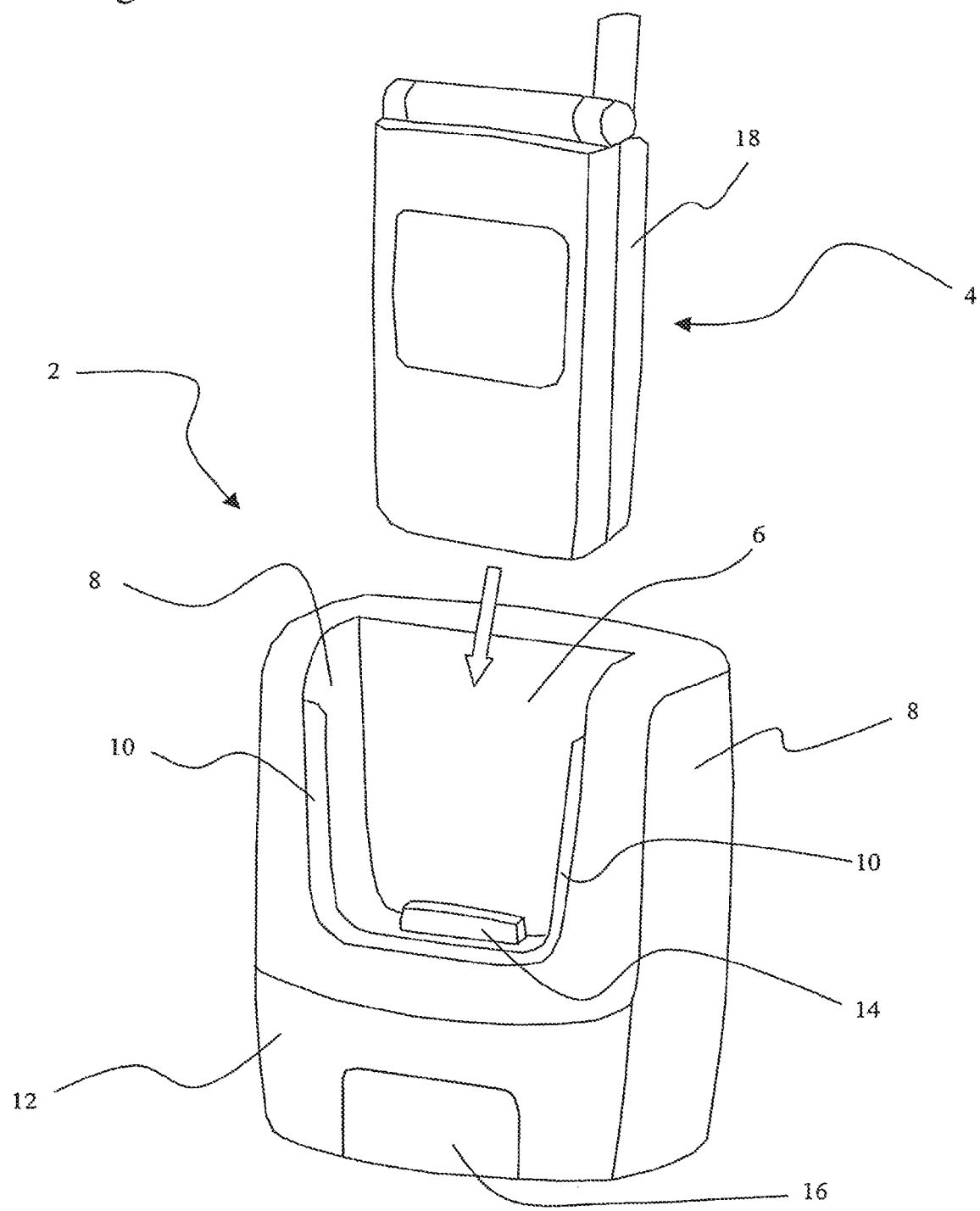
FIG. 1 shows an embodiment of the cradle according to the invention, together with a mobile phone to be received in the cradle.

In FIG. 1 a three-dimensional view of a cradle according to the present invention is shown, as a whole indicated by the reference sign 2. The cradle is designed for receiving a mobile phone 4, which is to be inserted on the top side of the cradle. The cradle is basically constituted by a rear bearing surface 6, two left and right side walls 8, two guide rails 10 (in this figure shown as integral guide rails) and a bottom part 12. The rear bearing surface 6, the side walls 8 and the guide rails 10 define slots for receiving the side sections of a mobile phone 4. The mobile phone 4 is inserted on top of the cradle as indicated by the arrow, and is then guided down to the bottom part of the cradle in the slots. It should be noted that in this figure a mobile phone of the fold or flip type is depicted. Such a phone must of course be usable while it is received in the cradle. In order to enable the phone to be folded open into its operable configuration inside the cradle only the rear (closed position) or lower part 18 (open position) of the phone is to be inserted into the slots. Thus the phone of this type is both supported well and may still be operated by the user. However it is to be noted that because of the guide rails 10 the phone can not be closed completely while inside the cradle. As such flip-phones usually comprise some kind of sensor for detecting if the phone is in its open or closed position the guide rails 10 will have to be formed such that the two sections of the housing may still be closed enough for the sensor to detect a closed state. To achieve this the guide rails 10 may be arranged such that they do not extend all the way from the bottom part up to the top side of the cradle, and additionally (as can be seen better in FIG. 4) they may be formed tapering towards to top side of the cradle. In both cases they will have to be formed being as slim as possible to support fold phones. However the cradle according to the invention can also be used with phones of the monoblock type and of the slide-type. After the phone is inserted and guided down to the bottom part 12 a connector element 14 mechanically and electrically engages the bottom connector of the phone. The connector element 14 (which may be part of an exchangeable module 16 to be explained in more detail in conjunction with FIG. 2) acts as a main retaining element of the cradle. The slots formed by the rear bearing surface 6, the side walls 8 and the guide rails 10 act as retaining elements against forces acting on the mobile phone in a direction substantially perpendicular to the slots. In most embodiments these slots will act as passive retainers, i.e. without applying pressure to the phone housing, are just provided for guiding the phone in a direction parallel to the longitudinal axis of the phone. However the guide rails 10 may also be designed such as to apply a certain force to the phone housing to support the retaining function, e.g. spring-biased or partially elastic.

The connector element 14 acts as the main mechanical locking element of the cradle of the invention. A number of means may be used such as clamps or hooks. The connector element 14 acts as a locking element retaining against forces acting on the phone in a direction parallel to the slots, through a force-fit engagement with the bottom connector of the mobile phone. To ensure this it may be necessary to employ rigid (e.g. metal) parts for the mechanical connection with the bottom connector of the phone, also it may be necessary for the corresponding phone to comprise corresponding rigid parts (e.g. e metal frame) in the bottom connector for engaging with the connector element 14. Securing the mobile phone safely in the cradle is important to meet the requirements for crash-, bump- and shock tests (as for example ECE 16R and ECE 21R guidelines).

It is to be noted that the connector element 14 in FIG. 1 is only representative for different connector elements, which may also comprise hooks or clamps or the like not explicitly depicted. Only as examples the trapezoidal mini USB type B connector or the Nokia® Pop-Port™ connector can be mentioned as being comprised in the connector element.

Figure 2:
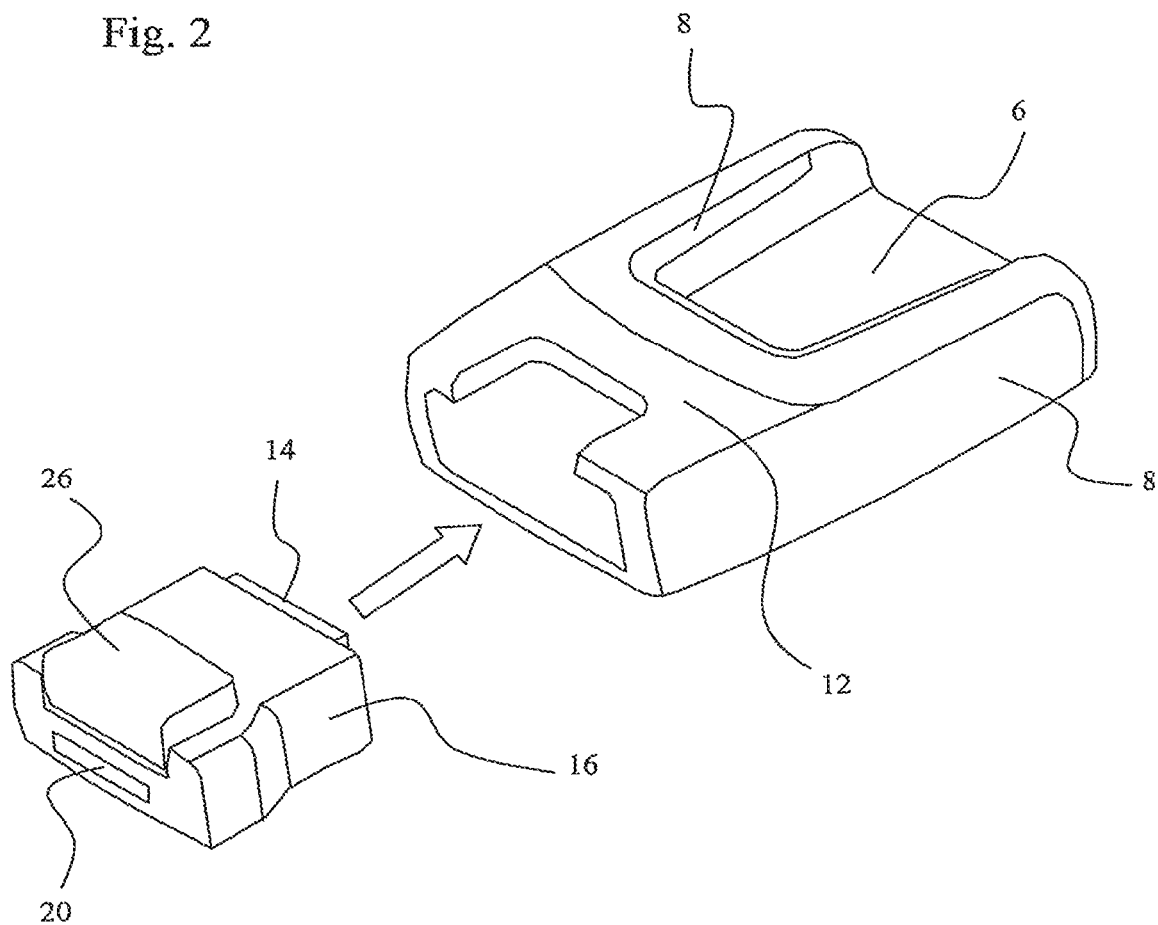
FIG. 2 illustrates another embodiment of the cradle according to the invention with an exchangeable connector element.

In FIG. 2 a cradle similar to the one depicted in FIG. 1 is illustrated in a three-dimensional view. The cradle shown here comprises a rear bearing surface 6, left and right side walls 8, and guide rails 10 being located on the inner front side of the side walls 8. The guide rails 10 protrude laterally from the side walls 8 in a direction towards each other. The rear bearing surface 6, the left and right side walls 8, and the guide rails 10 are formed as an integral part in this exemplary embodiment. In this figure an embodiment of the cradle of the invention in which the connector element 14 is contained in an exchangeable unit 16.

This unit 16 can be fitted in the main cradle body by any suitable means, for example with screws or a kind of snap-in attachment, which are in itself known and shall thus not be discussed in depth here. Such a modular configuration of the cradle of the invention provides great flexibility with respect to the design rules, as the connector element 14 and the main cradle body comprising the guiding slots can be designed independently of each other. Usually a family of mobile phones comprises a compatible bottom connector throughout a series of phone models. However the actual design of the phone housing may differ, particularly with respect to size and geometry. Therefore such a modular configuration enables the manufacturer of the cradle to use an identical connector element for all phones belonging to a certain family with identical or similar bottom connector, together with model-specific main cradle bodies. This concept may of course also be applied vice versa. The connector module 16 will also comprise an interface 20 for connecting with certain accessory devices like hands-free kits or the like.

The interface 20 may be implemented as a cable being fixed on the module 16, or a socket for an, external cable. Thus this module 16 will probably be the most cost-intensive single part of a cradle according to this embodiment. It is therefore especially advantageous for a manufacturer to be able to limit necessary design changes to the main cradle body only. In this context it may also be envisaged to provide a release element (not shown) in this module 16, such that the main cradle body may be made without comprising any movable parts. The advantage of this should be evident. Release elements will be explained in more detail in conjunction with FIG. 3.

Figure 3:
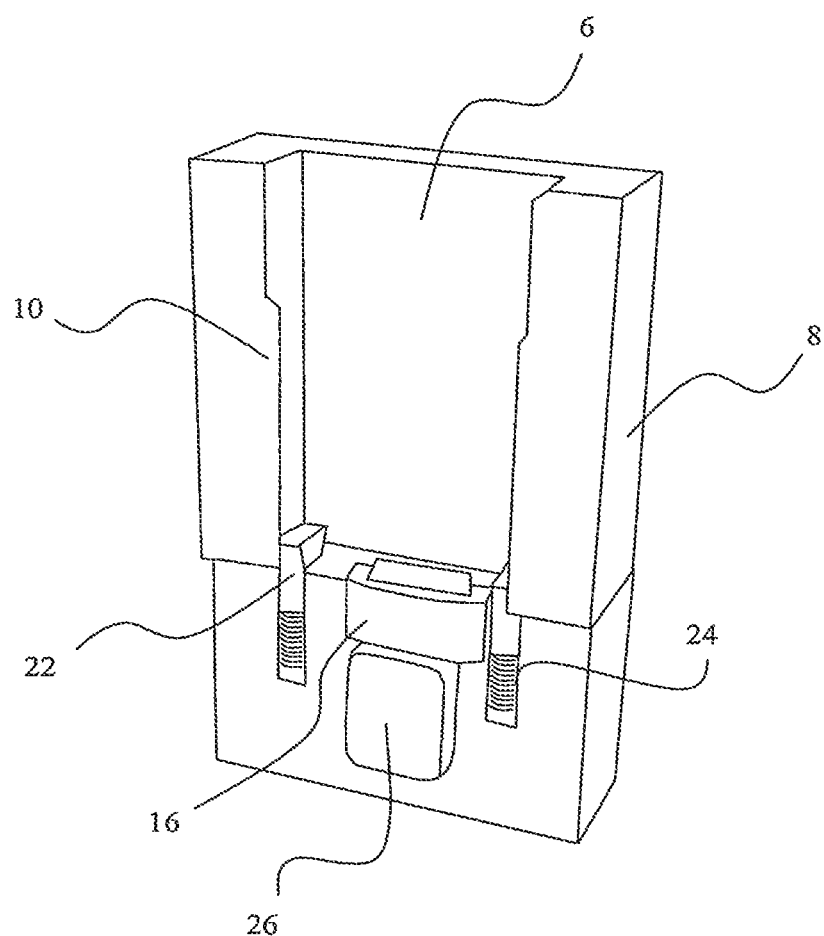
FIG. 3 shows another embodiment of the cradle according to the invention in a partial cut-away view.

FIG. 3 shows another example embodiment of the present invention. The bottom part is illustrated in a cut-away fashion here. The cradle consists basically of the same elements as already described in conjunction with FIGS. 1 and 2, so for a description of those parts reference shall be made to these figures. Shown here are two release elements which are intended to assist in releasing a mobile phone from the cradle. For that purpose two small plungers 22 are provided that can be actuated to push the mobile phone upwards to disengage from the connector element 14 such that the phone can easily be removed from the cradle. To reduce the required actuating force these plungers 22 may be designed with resilient properties, as depicted here for example by providing respective springs 24. The spring-loaded release element can be actuated by a push button 26 (wherein the connection to the element is not explicitly depicted as it will be located inside the cradle body here). A preferred embodiment of the release elements could be configured such that the springs are forced down when the phone is inserted, and become locked as soon as the phone has securely engaged with the connector element. This could be achieved using some already known mechanism. The push button 26 would then be provided to unlock the springs again, and the plungers 22 would be driven upwards by the spring force so that the phone would disengage from the connector element. The phone could then be removed from the cradle without much effort. Depending on the type of connector element 14 the described release mechanism can also be used for releasing locking elements which are provided within the connector element itself, like hooks or clamps. If such are integrated in the connector element 14 engaging with the bottom connector of the mobile phone they must of course be unlocked/released before applying a force directed upwards for removing the mobile phone from the cradle.

It should be noted that other means with resilient properties may also be used instead of springs, e.g. some elastomer elements. Further the release mechanism can also be designed without means for assisting in the removal of the phone. For example the push button could, through a deflection or lever mechanism, directly actuate the plungers 22. This would simplify the release mechanism. However depending on the involved retaining forces of the connector element 14 such a solution could require more effort from the user to disengage the phone. As already mentioned before (see description of FIG. 2) a release element or elements could be comprised in a module together with the connector element, to even further support a modular design of the cradle.

Figure 4:
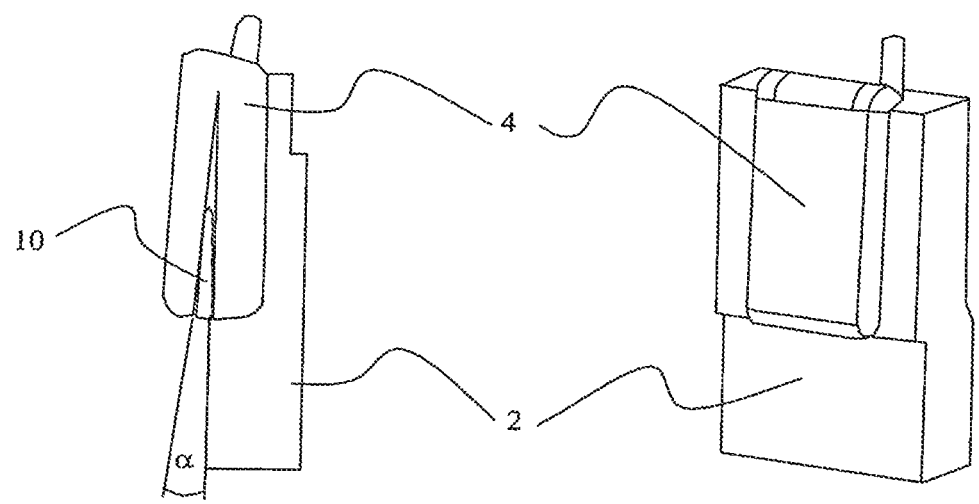
FIG. 4 illustrates an embodiment particularly designed for being used with a mobile phone of the flip-type.

FIG. 4 illustrates an embodiment of the cradle 2 of the invention particularly for a mobile phone 4 of the fold or flip type. On the left side of this figure it can be seen that the guide rails 10 are formed tapered in the direction towards their upper ends, such that the two sections of the housing can nearly be closed while the phone 4 is inside the cradle 2. For example the guide rails 10 can have a substantially conical form. In the closed configuration of the phone the two halves of the housing will thus enclose an angle α which is very small, e.g. 3.5°. In this manner is can be ensured that a sensor provided in the phone for detecting if the phone is closed still operates as required. The phone can be received in the cradle and stay closed while it is not in use, but it can also be folded open to be operated by a user.

The cradle of the invention also enables using yet another type of phone which has become rather famous recently, the slide phone. To be able to receive such a phone the guide rails must be designed such that they comprise a step defining upper and lower sections, respectively, for receiving the upper and lower sections of the slide phone. However, in contrast to a foldable phone, a phone of the slide type can only be received in a cradle according to the invention in its slid open position. Otherwise a secure hold of the phone could not be ensured for this phone type.

As can be taken from the above description a cradle according to the invention can be used for the main three principle types (also called form factors) of mobile phones currently used, which are the conventional monoblock type, the flip or fold type and also the slide type. The cradle of the invention does not make use of special fixing holes provided on a mobile phone, thus it is particularly useful for phones which do commonly not have such holes, e.g. fold phones. The invention enables a great deal of flexibility for design, and support of a mobile phone holder device/cradle at the same time. This means that all requirements of retaining capabilities of the cradle can be fulfilled as may be required for crash safety and the like. It further offers the possibility to cut down costs in the mobile phone development process by reducing the costs for the required tooling (inter alia because of the fixing holes which can be omitted at all), and also by greatly simplifying the development work for electrical components. Through a modular design the invention also enables to use standard components (e.g. connector element) together with individual phone-specific components to provide a cradle perfectly adapted for a particular mobile phone that can though be manufactured with reduced effort and/or costs.

The invention claimed is:

1. A method of manufacturing a cradle for a mobile phone, comprising:
constituting the cradle by a rear bearing surface, left and right side walls each connected to the rear bearing surface, a bottom portion connected to the rear bearing surface, and a receiver formed therein, wherein the bottom portion is configured to receiver an exchangeable unit, said exchangeable unit comprising:
a connector element for mechanically and electrically engaging a bottom connector of said mobile phone, said connector element configured to lock onto said mobile phone to retain said mobile phone inside said cradle, and
at least one release element configured to disengage the lock between the connector element and said mobile phone when actuated; and
forming two guide rails respectively on the front side of said left and right side walls, and protruding laterally from said side walls, wherein said rear bearing surface, said side walls and said guide rails define left and right slots extending parallel to said side walls configured for:
receiving left and right side sections of said mobile phone,
guiding said mobile phone to said exchangeable unit, and
retaining said mobile phone received in said cradle against forces acting in a direction substantially perpendicular to said slots.

2. The method according to claim 1, wherein said forming two guide rails further comprises forming said two guide rails to be tapered in thickness from said exchangeable unit toward respective upper ends of said two guide rails.

3. The method according to claim 1, wherein forming said two guide rails further comprises forming said two guide rails to each have a step, the step defining upper and lower sections in said slots for receiving corresponding upper and lower sections of a mobile phone of the slide type in its open configuration.

4. The method according to claim 1, wherein said release element is manufactured such that, upon being actuated, said release element pushes a mobile phone received in said cradle upwards to assist in removing said mobile phone from said cradle.

5. The method according to claim 1, wherein said release element is manufactured spring-loaded for assisting in disengaging a mobile phone received in said cradle from said connector element and pushing said mobile phone away from said bottom portion.

6. The method according to claim 1, wherein said release element is manufactured integrally with said connector element in a single unit.

7. The method according to claim 1, wherein an interface is manufactured in said cradle for electrically connecting said connector element with accessory devices.

8. The method according to claim 1, wherein said constituting the rear bearing surface, the left and right side walls each connected to the rear bearing surface, the bottom portion connected to the rear bearing surface, and the receiver formed therein further comprises constituting said rear bearing surface, the left and right side walls each connected to the rear bearing surface, the bottom portion connected to the rear bearing surface, and the reciever formed therein further comprises consisting said rear bearing surface, the left and right side walls each connected to the rear bearing surface, the bottom portion connected to the rear bearing surface, and the receiver formed therein integrally in a single unit.

9. The method according to claim 1, wherein said connector element further comprises a Universal Serial Bus (USB) based connector.

10. The method according to claim 1, wherein forming said two guide rails further comprises forming said two guide rails to be spring-biased for applying a force to a mobile phone received in said cradle in a direction perpendicular to said slots.

11. The method according to claim 1, the method further comprising providing a mounting means for installing said cradle in a vehicle.

12. The method according to claim 1, wherein forming the two guide rails further comprises forming the two guide rails to be tapered such that a mobile phone comprising two halves may be substantially closed around at least a portion of the guide rails while received in the cradle.

13. The method according to claim 1, wherein the release element is manufactured as two spring-loaded plungers that are configured to release upon activation of the release element to push a mobile phone received in said cradle upwards to disengage the connector element from the mobile phone.

14. The method according to claim 1, wherein the bottom portion is configured to receive the exchangeable unit fitted in said bottom portion along a direction substantially parallel to said guide rails.

15. A cradle for a mobile phone, comprising:
a rear bearing surface;
left and right side walls each connected to the rear bearing surface;
a bottom portion also connected to the rear bearing surface and comprising a receiver formed therein;
an exchangeable unit removeably connected to said receiver, said exchangeable unit comprising:
a connector element for mechanically and electrically engaging a bottom connector of said mobile phone, said connector element configured to lock onto said mobile phone to retain said mobile phone inside said cradle, and
at least one release element configured to disengage the lock between the connector element and said mobile phone when actuated; and
two guide rails formed respectively on the front side of said left and right side walls, and protruding laterally from said side walls, wherein said rear bearing surface, said side walls and said guide rails define left and right slots extending parallel to said side walls configured to:
receive left and right side sections of said mobile phone,
guide said mobile phone to said exchangeable unit, and
retain said mobile phone received in said cradle against forces acting in a direction substantially perpendicular to said slots.

16. The cradle according to claim 15, wherein said guide rails are tapered in thickness from said exchangeable unit towards their upper ends.

17. The cradle according to claim 15, wherein said guide rails each have a step defining upper and lower sections in said slots for receiving corresponding upper and lower sections of a mobile phone of the slide type in its open configuration.

18. The cradle according to claim 15, wherein said at least one release element, upon being actuated, pushes a mobile phone received in said cradle upwards to assist in removing said mobile phone from said cradle.

19. The cradle according to claim 15, wherein said at least one release element is spring-loaded for assisting in disengaging a mobile phone received in said cradle from said connector element and pushing said mobile phone away from said bottom portion.

20. The cradle according to claim 15, wherein said at least one release element is integrally formed with said connector element in a single unit.

21. The cradle according to claim 15, further comprising an interface in said cradle for electrically connecting said connector element with accessory devices.

22. The cradle according to claim 15, wherein said rear bearing surface, said side walls and said guide rails are integrally formed in a single unit.

23. The cradle according to claim 15, wherein said connector element comprises a Universal Serial Bus (USB) based connector.

24. The cradle according to claim 15, wherein said guide rails are spring-biased for applying a force to a mobile phone received in said cradle in a direction perpendicular to said slots.

25. The cradle according to claim 15, further comprising a mounting means for installing said cradle in a vehicle.

26. The cradle according to claim 15, wherein the guide rails are tapered such that a mobile phone comprising two halves may be substantially closed around at least a portion of the guide rails while received in the cradle.

27. The cradle according to claim 16, wherein the at least one release element comprises two spring-loaded plungers that are configured to release upon activation of the release element to push a mobile phone received in said cradle upwards to disengage the connector element from the mobile phone.

28. The cradle according to claim 15, wherein the receiver formed in the bottom portion further comprises at least one slot configured to receive the exchangeable unit along a direction substantially parallel to said guide rails.

* * * * *